United States Patent Office.

CARL WANDEL, OF WALDAU, NEAR BERNBURG, NORTH GERMAN CONFEDERATION, ASSIGNOR TO F. O. MATTHIESSEN AND W. A. WIECHERS, OF NEW YORK CITY.

Letters Patent No. 92,405, dated July 6, 1869.

---

IMPROVEMENT IN THE MANUFACTURE OF HYDRATE OF MAGNESIA.

---

The Schedule referred to in these Letters Patent and making part of the same.

---

To all whom it may concern:

Be it known that I, CARL WANDEL, of Waldau, near Bernburg, in the Duchy of Anhalt, North German Confederation, have discovered a new and useful Improvement in the Manufacture or Production of Hydrate of Magnesia; and I do hereby declare that the following is a full, clear, and exact description of the same.

Various processes have been employed for producing or obtaining hydrate of magnesia, but it will suffice to refer to two well-known methods as being more prominent.

The one of these consists in taking carbonate of magnesia and exposing it to heat, which expels the carbonic acid out of the carbonate of magnesia, when hydrate of magnesia remains.

The other method is by decomposing soluble magnesia salts with caustic potassa or caustic soda.

Both of these methods are expensive and otherwise objectionable.

The process, which is the subject of the present invention, obviates these objections, and is based upon the well-known fact, that all sea-water contains or has chemically combined with it, a certain percentage of magnesia, in the form of sulphate of magnesia and chloride or muriate of magnesia.

The invention consists in obtaining hydrate of magnesia from these combinations, by the use of slaked lime as a decomposer, substantially as hereinafter described, the sulphate of magnesia, when brought in contact with milk of lime or lime-water, being decomposed and plaster of Paris formed, which latter remains in solution whilst hydrate of magnesia is precipitated, and the chloride or muriate of magnesia ($MgCl+HO$) being also decomposed by the lime-water and chloride of calcium or muriate of lime ($CaCl+HO$) formed, which likewise remains in solution, leaving hydrate of magnesia as a precipitate.

Thus, to carry out the invention, it is only necessary to bring sea-water in contact with the caustic lime (slaked lime) or milk of lime, when by the decomposition produced, hydrate of magnesia is precipitated.

This may be done by taking, for instance, sea-water of the Atlantic ocean, which contains nearly one-third ($\frac{1}{3}$) per cent. of magnesia, ($MgO+HO$,) and using, for its decomposition, one-sixth ($\frac{1}{6}$) of one per cent. of caustic lime, or, in other words, for each one hundred (100) pounds of sea-water using one-sixth ($\frac{1}{6}$) of a pound of slaked lime; but these proportions may be more or less varied.

The lime should be spread out in large flat basins, and the sea-water run over it, and the whole be stirred up thoroughly, and allowed to remain for the space of six (6) hours, more or less, until settled, when the clear solution should be run off and a fresh supply of sea-water admitted to the basin.

This may be continued for four or six times in succession, until all the caustic lime is combined and washed off, as chloride of lime and the hydrate of magnesia remains or takes its place.

The hydrate of magnesia thus obtained is then washed with fresh water, dried, and pressed ready for use.

What is here claimed, and desired to be secured by Letters Patent, is—

The manufacture of hydrate of magnesia from sea-water, by the use of lime, substantially as described.

CARL WANDEL.

Witnesses:
HENRY T. BROWN,
J. O. DONNEY.